United States Patent
Aoki et al.

(10) Patent No.: US 10,081,267 B2
(45) Date of Patent: Sep. 25, 2018

(54) HYBRID VEHICLE

(71) Applicant: TOYOTA JIDOSHA KABUSHIKI KAISHA, Toyota-shi, Aichi-ken (JP)

(72) Inventors: Takanori Aoki, Nisshin (JP); Koji Hokoi, Toyota (JP); Koji Yoshihara, Kariya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/421,712

(22) Filed: Feb. 1, 2017

(65) Prior Publication Data

US 2017/0217423 A1  Aug. 3, 2017

(30) Foreign Application Priority Data

Feb. 3, 2016 (JP) ................. 2016-019212

(51) Int. Cl.
*B60K 6/445* (2007.10)
*B60K 6/365* (2007.10)
(Continued)

(52) U.S. Cl.
CPC ............ *B60L 11/187* (2013.01); *B60K 6/365* (2013.01); *B60K 6/383* (2013.01); *B60K 6/445* (2013.01); *B60L 11/1861* (2013.01); *B60W 20/40* (2013.01); *B60K 2006/266* (2013.01); *B60W 2520/10* (2013.01); *B60W 2520/105* (2013.01); *B60W 2540/10* (2013.01); *B60W 2540/103* (2013.01); *B60W 2710/085* (2013.01); *B60W 2720/106* (2013.01); *F16H 3/72* (2013.01); *F16H 3/727* (2013.01); *Y02T 10/6239* (2013.01); *Y10S 903/906* (2013.01); *Y10S 903/907* (2013.01); *Y10S 903/91* (2013.01); *Y10S 903/913* (2013.01); *Y10S 903/93* (2013.01)

(58) Field of Classification Search
None
See application file for complete search history.

(56) References Cited

U.S. PATENT DOCUMENTS 5,788,006 A      8/1998  Yamaguchi
2004/0166980 A1* 8/2004  Supina ............... B60K 6/365
                                                     475/5

(Continued)

FOREIGN PATENT DOCUMENTS

JP    08-295140    11/1996
JP    2013-086516  5/2013
(Continued)

*Primary Examiner* — Colby M Hansen
(74) *Attorney, Agent, or Firm* — Finnegan, Henderson, Farabow, Garrett & Dunner, LLP

(57) ABSTRACT

Transition is made from a motor single-drive mode to a motor dual-drive mode while there is a margin in torque output from a motor MG2 with respect to rated torque. With this, the torque of the motor MG1 is changed slowly in the motor dual-drive mode, whereby it is possible to suppress the generation of vibration (shock) due to torsion of a damper and to compensate for a shortage of the torque of the motor MG1 due to slow change processing with an increase in torque from the motor MG2. As a result, it is possible to achieve both of reduction of a shock due to the torque of the motor MG1 and output of required torque to a drive shaft.

4 Claims, 12 Drawing Sheets

(51) Int. Cl.
  *B60L 11/18* (2006.01)
  *B60K 6/383* (2007.10)
  *B60W 20/40* (2016.01)
  *B60K 6/26* (2007.10)
  *F16H 3/72* (2006.01)

(56) References Cited

U.S. PATENT DOCUMENTS

| | | | | |
|---|---|---|---|---|
| 2005/0049100 | A1* | 3/2005 | Ai | B60K 6/365 |
| | | | | 475/5 |
| 2010/0262322 | A1* | 10/2010 | Yokouchi | B60K 6/26 |
| | | | | 701/22 |
| 2014/0243145 | A1* | 8/2014 | Iwasa | F16H 1/28 |
| | | | | 475/331 |
| 2015/0367839 | A1* | 12/2015 | Murata | H02K 7/003 |
| | | | | 475/2 |
| 2016/0001764 | A1 | 1/2016 | Iwase et al. | |
| 2016/0214598 | A1 | 7/2016 | Tabata et al. | |

FOREIGN PATENT DOCUMENTS

| | | |
|---|---|---|
| JP | 2013-086688 | 5/2013 |
| JP | 2015-051686 A | 3/2015 |
| WO | WO2014/128925 A1 | 6/2014 |

\* cited by examiner

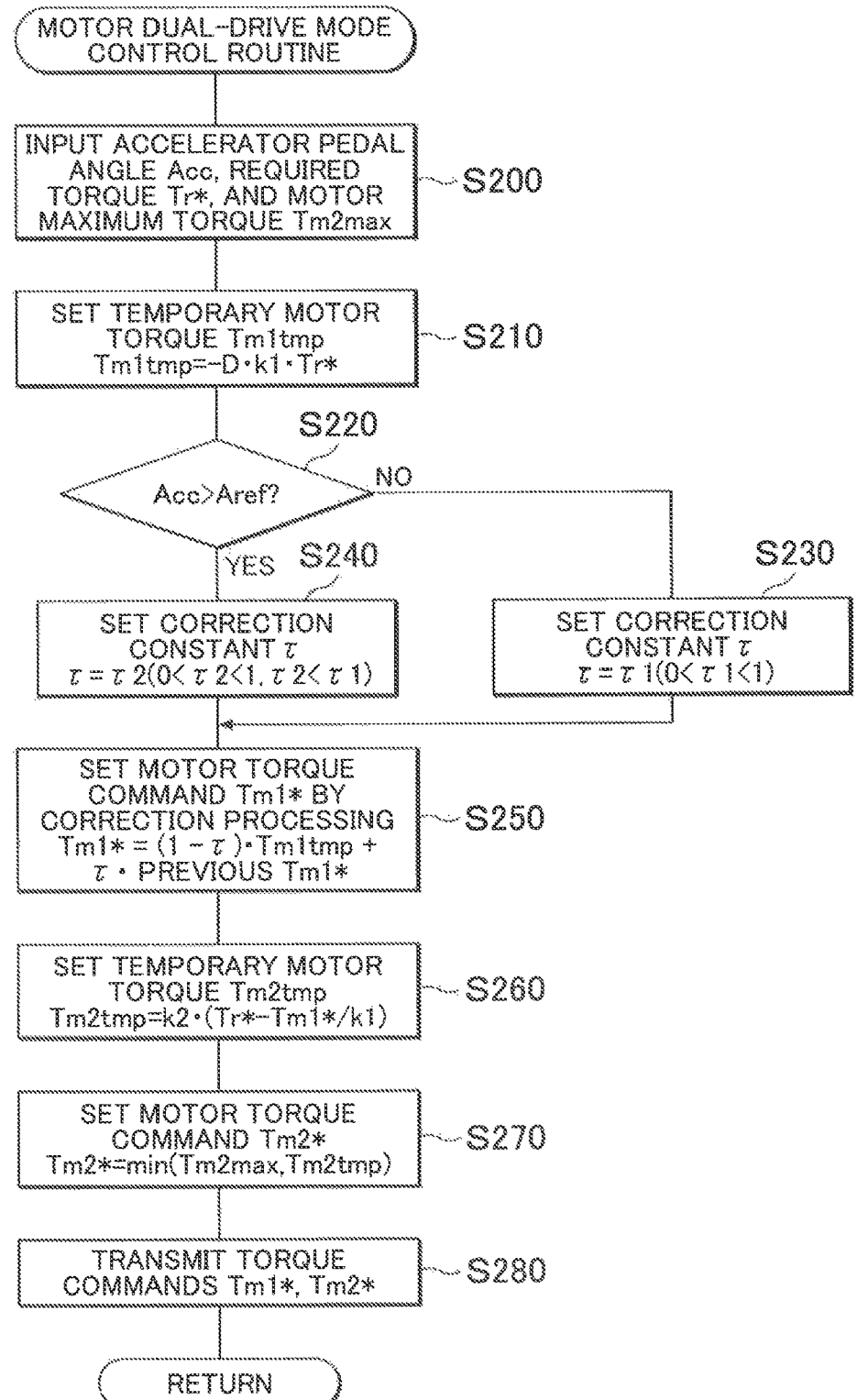

HYBRID VEHICLE

INCORPORATION BY REFERENCE

The disclosure of Japanese Patent Application No. 2016-019212 filed on Feb. 3, 2016 including the specification, drawings and abstract is incorporated herein by reference in its entirety.

BACKGROUND

1. Technical Field

The present embodiment relates to a hybrid vehicle, and in particular, to a hybrid vehicle including an engine, a first motor, a planetary gear mechanism, a second motor, and a power storage device.

2. Description of Related Art

Japanese Patent Application Publication No. 08-295140 (JP 08-295140 A) discloses a hybrid vehicle in which a drive shaft coupled to a rotary shaft of a first motor (motor generator), an output shaft of an engine, and an axle is connected to a sun gear, a carrier, and a ring gear of a planetary gear mechanism. In this hybrid vehicle, a second motor (or an electric motor) is connected to the drive shaft, and a one-way clutch which inhibits rotation in a reverse direction is provided in the output shaft of the engine. In this hybrid vehicle, when the torque (or drive force) of the second motor cannot be used as required torque (or required drive force) required for vehicle traveling, a shortage of torque is compensated for with torque (or drive force) from the first motor. That is, the hybrid vehicle is configured to travel in a mode (or a motor dual-drive mode) in which traveling is performed with torque from the first motor and the second motor.

SUMMARY

On the other hand, if torque output from the first motor rapidly changes, a shock may occur in the vehicle. For this reason, when torque output from the first motor rapidly changes, in the motor dual-drive mode, it is desirable to slowly change torque output from the first motor. However, if torque output from the first motor is slowly changed in a state where maximum torque is output from the second motor, it is not possible to compensate for a shortage of the torque of the first motor due to slow change in torque by the second motor; thus, required torque may not be output.

The embodiment provides a hybrid vehicle capable of achieving reduction of a shock due to torque from the first motor and output of required torque.

A hybrid vehicle of the embodiment includes an engine, a first motor configured to generate electric power, a planetary gear device having at least one planetary gear, the planetary gear device being a device in which the engine, the first motor, and a drive shaft coupled to an axle are connected to rotating elements such that the first motor, the engine, and the drive shaft are arranged in this order in a collinear diagram, a second motor configured to output power to the drive shaft, a power storage device configured to exchange electric power with the first motor and the second motor, a rotation regulating mechanism provided between the engine and the second rotating element, the rotation regulating mechanism being configured to regulate rotation of the second rotating element, a traveling mode selection unit configured to select any one of a plurality of traveling modes including a motor single-drive mode in which traveling is able to be performed with torque only from the second motor and a motor dual-drive mode in which the second rotating element is brought into a rotation stop state by the rotation regulating mechanism and traveling is able to be performed with torque from the first motor and the second motor, and a control unit configured to control the engine, the first motor, and the second motor such that traveling is performed with the required torque using the selected traveling mode. The traveling mode selection unit is a unit configured to select the motor dual-drive mode if the required torque exceeds a threshold when the motor single-drive mode is selected, the control unit is a unit configured to control the first motor and the second motor such that traveling is performed with the required torque while executing slow change processing for slowly changing torque output from the first motor when the motor dual-drive mode is selected, and the threshold is determined to torque smaller than maximum torque outputtable from the second motor.

In the hybrid vehicle of the embodiment, if the required torque exceeds a threshold when the motor single-drive mode is selected, transition is made to the motor dual-drive mode. Then, when traveling is performed in the motor dual-drive mode, the first motor and the second motor are controlled such that traveling is performed with the required torque while executing the slow change processing for slowly changing torque output from the first motor. The threshold is determined to torque smaller than the maximum torque outputtable from the second motor. With this, it is possible to perform transition from the motor single-drive mode to the motor dual-drive mode while there is a margin in torque output from the second motor. Accordingly, it is possible to reduce a shock due to torque from the first motor through the slow change processing and to compensate for a shortage of the torque of the first motor due to the slow change processing with an increase in torque of the second motor. As a result, it is possible to achieve both of reduction of a shock due to torque from the first motor and output of required torque.

The "planetary gear device" may have a planetary gear having a sun gear to which the first motor is connected, a carrier to which the engine is connected, and a ring gear to which the drive shaft is connected. The "second motor" may be directly coupled to the drive shaft. The "planetary gear device" may have a planetary gear, and a reduction gear connected to the ring gear. The planetary gear has a sun gear to which the first motor is connected, a carrier to which the engine is connected, and a ring gear to which the drive shaft is connected. The "second motor" may be connected to the ring gear through the reduction gear to be mechanically coupled to the drive shaft. The "planetary gear device" may include a first planetary gear, a second planetary gear, a clutch, and a brake. The first planetary gear is a planetary gear including a first sun gear, a first carrier to which the drive shaft is connected, and a first ring gear to which the engine is connected. The second planetary gear is a planetary gear including a second sun gear to which the first motor is connected, a second carrier to which the drive shaft and the first carrier are connected, and a second ring gear. The clutch is configured to connect the first sun gear and the second ring gear and to release the connection of the first sun gear and the second ring gear. The brake is configured to fix the second ring gear unrotatably and to release the second ring gear rotatably. The "second motor" may be connected to the first sun gear to be mechanically coupled to the drive shaft.

As the rotation regulating mechanism, a one-way clutch which permits only rotation in a normal rotation rotation of the engine may be used, or a brake which fixes the second rotating element unrotatably or releases the fixed state of the second rotating element may be used. In a case where a one-way clutch is used as the rotation regulating mechanism, control is performed such that the second rotating element rotates in the normal rotation direction of the engine. In a case where a brake is used as the rotation regulating mechanism, since the brake is turned on to execute the motor dual-drive mode, control for turning off the brake at the time of the start of rotation of the second rotating element and turning on at the time of the stop of rotation of the brake is also included.

In the hybrid vehicle of the embodiment, the control unit may be a unit configured to permit larger change in torque in the slow change processing when a required acceleration exceeds a predetermined acceleration than when the vehicle acceleration is equal to or lower than the predetermined acceleration. Alternatively, the control unit may be a unit configured to perform greater change in torque in the slow change processing when an accelerator pedal angle exceeds a predetermined opening than when the acceleration opening is equal to or less than the predetermined opening. When the required acceleration is large or when the required torque is large, noise accompanied by traveling also normally becomes large; thus, even if somewhat of a shock occurs, it is considered that a driver hardly feels a sense of discomfort. For this reason, large change in torque is permitted in the slow change processing, whereby it is possible to rapidly converge change in torque from the first motor, and to reduce a burden imposed on the rotation regulating mechanism.

In the hybrid vehicle of the embodiment, an output shaft of the engine may be connected to the second rotating element through a torsional element, and the torsional element may be provided between the rotation regulating mechanism and the second rotating element. With this, it is possible to protect the rotation regulating mechanism from an input of excessive torque in a case where the second rotating element is brought into the rotation stop state. Furthermore, since the slow change processing is executed for torque from the first motor, it is possible to relax torsion of the torsional element due to torque from the first motor, thereby reducing the occurrence of a shock.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 5 is a flowchart showing an example of a motor dual-drive mode control routine;

DETAILED DESCRIPTION OF EMBODIMENTS

Next, a mode for carrying out the embodiment will be described in connection with an example.

Figure 1:
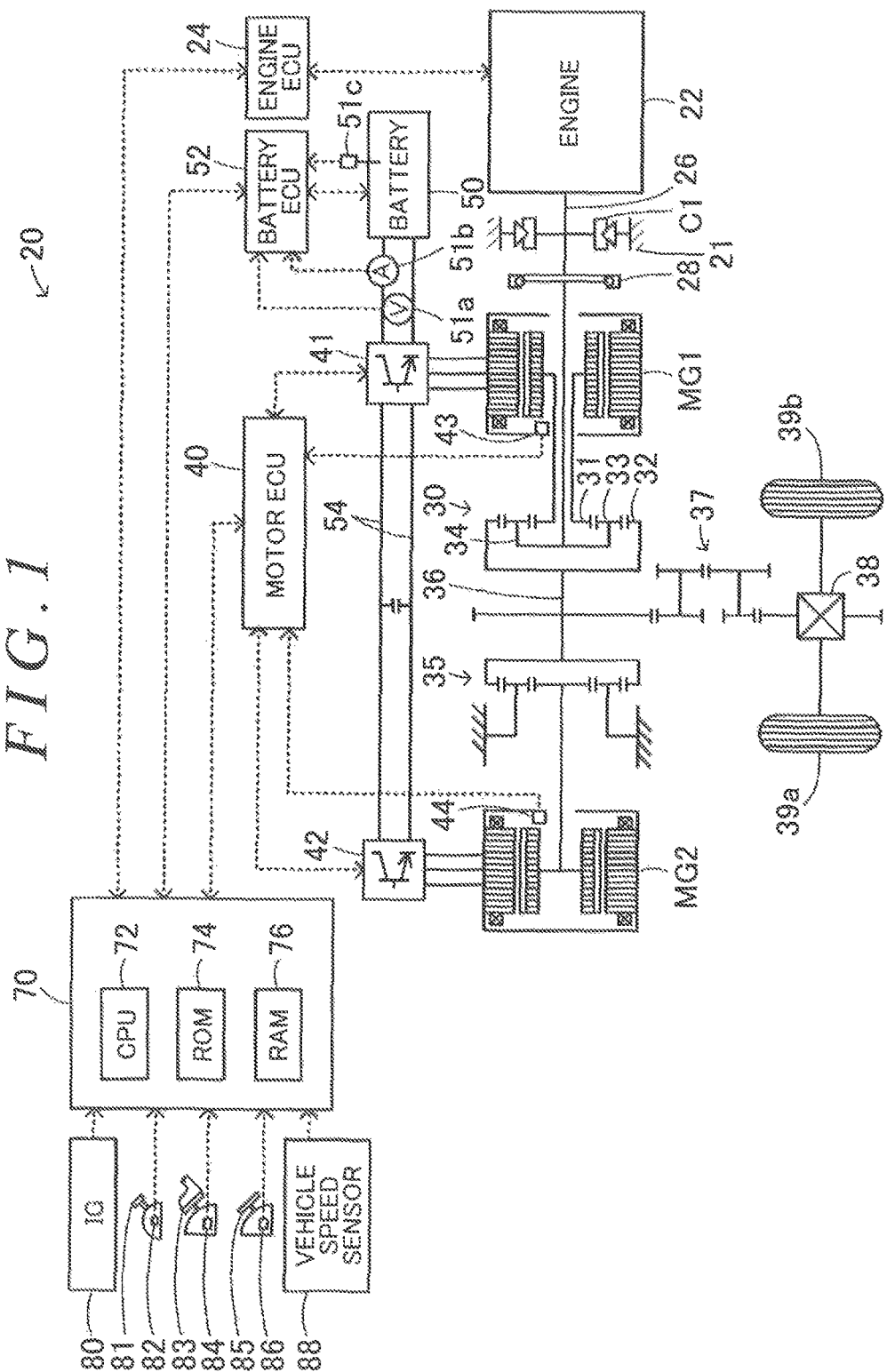
FIG. 1 is a configuration diagram showing the outline of the configuration of a hybrid vehicle 20 as an example of the embodiment.

FIG. 1 is a configuration diagram showing the outline of the configuration of a hybrid vehicle 20 as an example of the embodiment. As shown in the drawing, the hybrid vehicle 20 of the example includes an engine 22, a one-way clutch C1, a damper 28, a planetary gear 30, a motor MG1, a motor MG2, inverters 41, 42, a battery 50, and a hybrid electronic control unit (hereinafter, referred to as an HVECU) 70.

The engine 22 is constituted as an internal combustion engine which outputs power with gasoline, diesel, or the like as fuel. The engine 22 is operated and controlled by an engine electronic control unit (hereinafter, referred to as an "engine ECU") 24.

Though not shown, the engine ECU 24 is constituted as a microcomputer centering on a CPU. The engine ECU 24 includes, in addition to the CPU, a ROM which stores a processing program, a RAM which temporarily stores data, an input/output port, and a communication port. Signals from various sensors necessary for opening and controlling the engine 22 are input to the engine ECU 24 through the input port. Various control signals for opening and controlling the engine 22 are output from the engine ECU 24 through the output port. The engine ECU 24 calculates a rotation speed Ne of the engine 22 based on a signal from a crank position sensor (not shown) attached to a crank shaft 26 of the engine 22.

The planetary gear 30 is constituted as a single pinion type planetary gear mechanism including a sun gear 31, a ring gear 32, a plurality of pinion gears 33, and a carrier 34. The sun gear 31 is an external gear, and the ring gear 32 is an internal gear. A plurality of pinion gears 33 mesh with the sun gear 31 and the ring gear 32. The carrier 34 holds a plurality of pinion gears 33 rotatably and revolvably. A rotor of the motor MG1 is connected to the sun gear 31. A drive shaft 36 is connected to the ring gear 32. The drive shaft 36 is coupled to drive wheels 39a, 39b through a differential gear 38 and a gear mechanism 37. The crank shaft 26 of the engine 22 is connected to the carrier 34 through the damper 28.

The one-way clutch C1 is attached to the crank shaft 26 of the engine 22 and a case 21 fixed to a vehicle body. The one-way clutch C1 permits only rotation of the carrier 34 in the normal rotation direction of the engine 22 with respect to the case 21.

The damper 28 is an element configured to suppress torsional vibration. The damper 28 is provided on the post stage side of the one-way clutch C1 with respect to the crank shaft 26 of the engine 22, that is, between the one-way clutch C1 and the carrier 34.

The motor MG1 is constituted as, for example, a synchronous motor generator. As described above, the motor MG1 has the rotor connected to the sun gear 31 of the planetary gear 30. The motor MG2 is constituted as, for example, a synchronous motor generator. The motor MG2 has a rotor connected to the drive shaft 36 through a reduction gear 35. The inverters 41, 42 are connected to a power line 54 along with the battery 50. A smoothing capacitor is attached to the power line 54. The motors MG1, MG2 are rotationally driven when a plurality of switching elements (not shown) of the inverters 41, 42 are switched by a motor electronic control unit (hereinafter, referred to as a "motor ECU") 40.

Though not shown, the motor ECU 40 is constituted as a microprocessor centering on a CPU. The motor ECU 40 includes, in addition to the CPU, a ROM which stores a processing program, a RAM which temporarily stores data, an input/output port, and a communication port.

Signals from various sensors necessary for driving and controlling the motors MG1, MG2 are input to the motor ECU 40 through the input port. As a part of the signals from various sensors, the following signals are exemplified: rotation positions θm1, θm2 of the motors MG1, MG2 input from rotation position detection sensors 43, 44 which detect the rotation positions of the rotors of the motors MG1, MG2; and phase currents from a current sensor which detects a current flowing in the respective phases of the motors MG1, MG2.

A switching control signal or the like to the switching elements (not shown) of the inverters 41, 42 is output from the motor ECU 40 through the output port.

The motor ECU 40 is connected to the HVECU 70 through the communication port. The motor ECU 40 drives and controls the motors MG1, MG2 in response to a control signal from the HVECU 70. The motor ECU 40 outputs data relating to the drive states of the motors MG1, MG2 to the HVECU 70 as necessary. The motor ECU 40 calculates rotation speeds Nm1, Nm2 of the motors MG1, MG2 based on the rotation positions θm1, θm2 of the rotors of the motors MG1, MG2 from the rotation position detection sensors 43, 44.

The battery 50 is constituted as, for example, a lithium-ion secondary battery or a nickel-hydrogen secondary battery. As described, above, the battery 50 is connected to the power line 54 along with the inverters 41, 42. The battery 50 is managed by a battery electronic control unit (hereinafter, referred to as a "battery ECU") 52.

Though not shown, the battery ECU 52 is constituted as a microprocessor centering on a CPU. The battery ECU 52 includes, in addition to the CPU, a ROM which stores a processing program, a RAM which temporarily stores data, an input/output port, and a communication port.

Signals from various sensors necessary for managing the battery 50 are input to the battery ECU 52 through the input port. As a part of the signals from various sensors, the following signals are exemplified: a battery voltage Vb from a voltage sensor 51a provided between terminals of the battery 50; a battery current Ib (a positive value when discharged from the battery 50) from a current sensor 51b attached to an output terminal of the battery 50; and a battery temperature Tb from a temperature sensor 51c attached to the battery 50.

The battery ECU 52 is connected to the HVECU 70 through the communication port. The battery ECU 52 outputs data relating the state of the battery 50 to the HVECU 70 as necessary. The battery ECU 52 calculates charge/discharge power Pb as a product of the battery voltage Vb from the voltage sensor 51a and the battery current Ib from the current sensor 51b. The battery ECU 52 calculates a power storage ratio SOC based on an integrated value of the battery current Ib from the current sensor 51b. The power storage ratio SOC is the ratio of the capacity of electric power dischargeable from the battery 50 to the total capacity of the battery 50. Charge/discharge required power Pb* is set as electric power to be charged or discharged in and from the battery 50 in order to bring the power storage ratio SOC close to a target ratio.

The HVECU 70 is constituted as a microprocessor centering on a CPU 72. HVECU 70 includes, in addition to the CPU 72, a ROM 74 which stores a processing program, a RAM 76 which temporarily stores data, an input/output port, and a communication port.

Signals from various sensors are input to the HVECU 70 through the input port. As a part of the signals from various sensors, the following signals are exemplified: an ignition signal from an ignition switch 80; a shift position SP from a shift position sensor 82 which detects an operation position of a shift lever 81; an accelerator pedal angle Ace from an accelerator pedal position sensor 84 which detects the amount of depression of an accelerator pedal 83: a brake pedal position BP from a brake pedal position sensor 86 which detects the amount of depression of a brake pedal 85; and a vehicle speed V from a vehicle speed sensor 88.

As described above, the HVECU 70 is connected to the engine ECU 24, the motor ECU 40, and the battery ECU 52 through the communication port. The HVECU 70 performs exchange of various control signals or data with the engine ECU 24, the motor ECU 40, and the battery ECU 52.

The hybrid vehicle 20 of the example configured as above travels in a hybrid traveling mode (HV traveling mode) and an electric traveling mode (EV traveling mode). The HV traveling mode is a traveling mode in which traveling is performed using power from the engine 22, the motor MG1, and the motor MG2. The EV traveling mode is a traveling mode in which the operation of the engine 22 is stopped and traveling is performed using power from at least one of the motor MG1 or the motor MG2. The EV traveling mode includes a motor single-drive mode in which torque is not output from the motor MG1 and traveling is performed only with torque from the motor MG2 and a motor dual-drive mode in which traveling is performed with torque from the motor MG1 and torque from the motor MG2.

Figure 2:
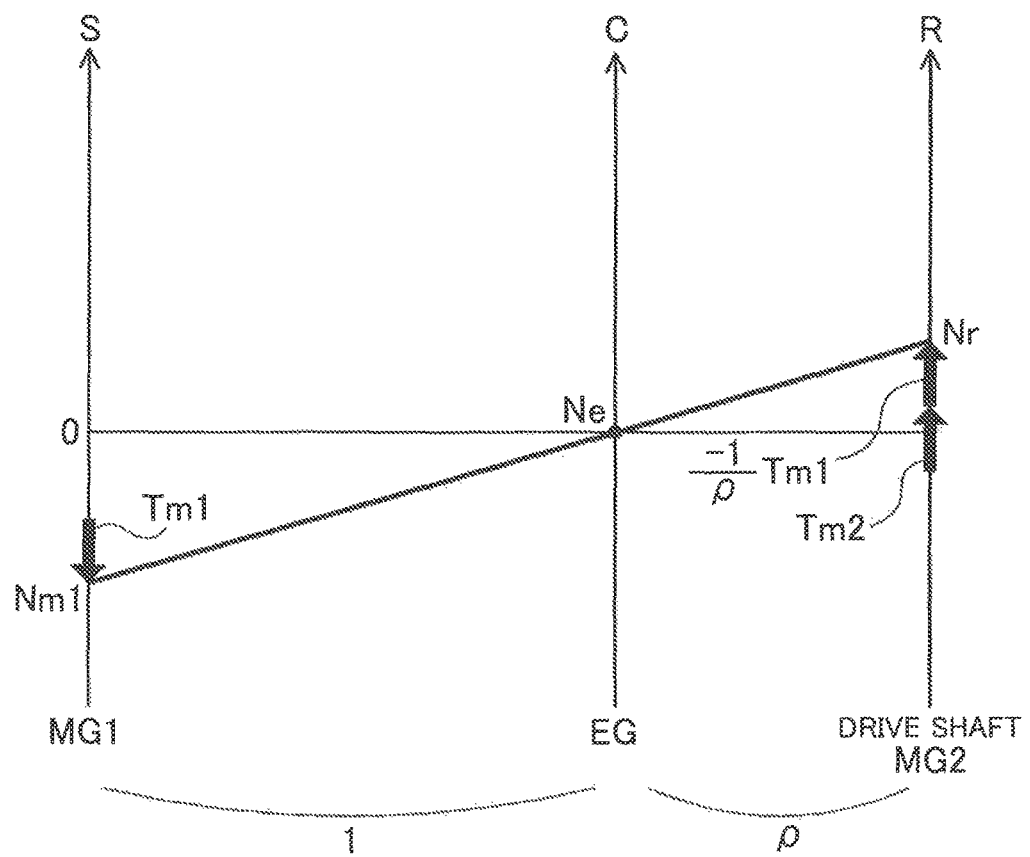
FIG. 2 is a collinear diagram showing the dynamic relationship between a rotation speed and torque in each rotating element of a planetary gear 30 in a motor dual-drive mode.

FIG. 2 is a collinear diagram showing the dynamic relationship between a rotation speed and torque in each rotating element of the planetary gear 30 in the motor dual-drive mode. In the drawing, an S axis on the left indicates the rotation speed of the sun gear which is the rotation speed of the motor MG1, a C axis at the center indicates the rotation speed of the carrier which is the rotation speed of the engine 22, and an R axis on the right indicates the rotation speed of the ring gear which is the rotation speed of the drive shaft 36. In the drawing, "ρ" is a gear ratio (the number of teeth of the sun gear/the number of teeth of the ring gear) of the planetary gear 30. A bold arrow on the R axis indicates torque (−Tm1/ρ) which is applied to the drive shaft 36 with torque output from the motor MG1 in the motor dual-drive mode, and torque Tm2 output from the motor MG2. As shown in the drawing, the planetary gear 30 has three rotating elements which are connected such that a rotary shaft of the motor MG1, the crank shaft 26 of the engine 22, and the drive shaft 36 are arranged in this order on the collinear diagram. For this reason, if negative torque is output from the motor MG1, the one-way clutch C1 connected to the crank shaft 26 takes a reaction force of motor torque and transmits torque from the motor MG1 to the drive shaft 36 as positive torque. With this, since the torque of the motor MG1 can be added to the torque of the motor MG2, it is possible to output torque exceeding the rated torque of the motor MG2 to the drive shaft 36.

Figure 3:
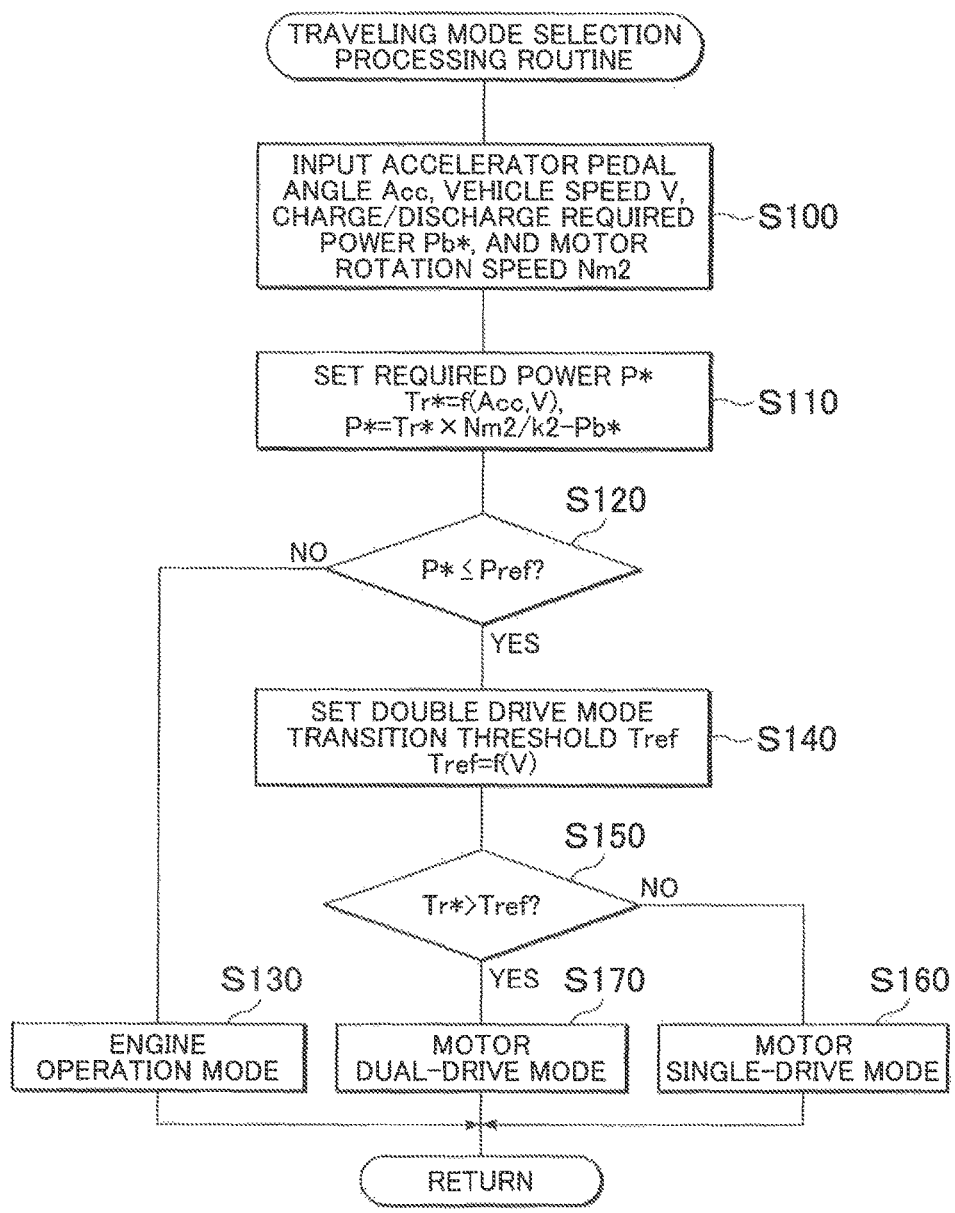
FIG. 3 is a flowchart showing an example of a traveling mode selection processing routine.

Next, the operation of the hybrid vehicle 20 of the example configured as above, and in particular, an operation to select a traveling mode and an operation in a case where the motor dual-drive mode is selected as the traveling mode will be described. First, the operation to select a traveling mode will be described. FIG. 3 is a flowchart showing an example of a traveling mode selection processing routine which is executed by the HVECU 70. This routine is repeatedly executed at every predetermined time (for example, every several msec).

If the traveling mode selection processing routine is executed, the CPU 72 of the HVECU 70 first executes processing for inputting data, such as the accelerator pedal angle Acc, the vehicle speed V, the charge/discharge required power Pb*, and the motor rotation speed Nm2 (Step S100). In regard to the accelerator pedal angle Ace, a value detected by the accelerator pedal position sensor 84 is input. In regard to the vehicle speed V, a value detected by the vehicle speed sensor 88 is input. In regard to the charge/discharge required power Pb*, a value set based on the power storage ratio SOC is input from the battery ECU 52 by communication. The motor rotation speed Nm2, a value calculated based on the rotation position θm2 of the rotor of the motor MG2 from the rotation position detection sensor 44 is input from the motor ECU 40 by communication.

If data is input in this way, required torque Tr* required for the drive shaft 36 and required power P* required for the entire vehicle are set based on the accelerator pedal angle Ace and the vehicle speed V (Step S110). The required torque Tr* can be determined by determining the relationship among the accelerator pedal angle Ace, the vehicle speed V, and the required torque Tr* in advance, storing the relationship in the ROM 74 as a required torque setting map, and when the accelerator pedal angle Ace and the vehicle speed V are given, deriving the corresponding required torque Tr* from the map. The required power Pe* can be calculated by multiplying the required torque Tr* by a rotation speed Nr of the drive shaft 36 to calculate traveling power Pdrv required for traveling and subtracting the charge/discharge required power Pb* (a positive value when discharged from the battery 50) of the battery 50 from the calculated traveling power Pdrv. The rotation speed Nr can be calculated, for example, by dividing the rotation speed Nm2 of the motor MG2 by a conversion coefficient k2 (the gear ratio of the reduction gear 35).

Figure 4:
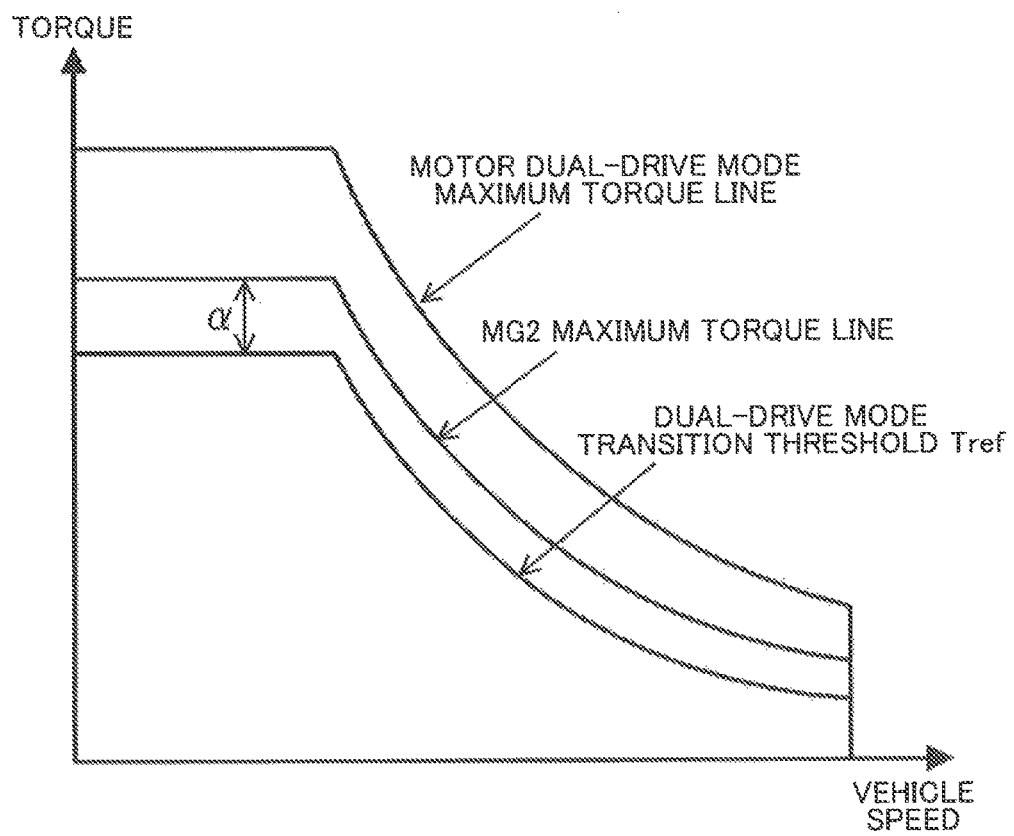
FIG. 4 is an explanatory view showing an example of a dual-drive mode transition threshold setting map.

It is determined whether or not the required power P* is equal to or less than a threshold Pref for determining transition from the EV traveling mode to an engine operation mode (Step S120). If it is determined that the required power P* is greater than the threshold Pref, the engine operation mode is selected (Step S130), the traveling mode selection processing routine ends. If it is determined that the required power P* is equal to or less than the threshold Pref, the EV traveling mode is selected. Then, a threshold (dual-drive mode transition threshold) Tref for determining transition from the motor single-drive mode to the motor dual-drive mode is set (Step S140). In regard to the dual-drive mode transition threshold Tref, the relationship between the vehicle speed V and the dual-drive mode transition threshold Tref is determined in advance and is stored as a map. Then, if the vehicle speed V is given, the corresponding dual-drive mode transition threshold Tref is derived from the map, and the dual-drive mode transition threshold Tref is set. FIG. 4 shows an example of a dual-drive mode transition threshold setting map. In FIG. 4, a line of a maximum value of torque outputtable from the motor MG2 to the drive shaft 36, that is, maximum torque (single-drive maximum torque) outputtable to the drive shaft 36 in the motor single-drive mode and a line of a maximum value of torque outputtable from the motor MG1 and the motor MG2 to the drive shaft 36, that is, maximum torque (dual-drive maximum torque) outputtable to the drive shaft 36 in the motor dual-drive mode are shown. As shown in the drawing, the dual-drive mode transition threshold Tref is set as a value lower than the maximum value (single-drive maximum torque) of torque outputtable from the motor MG2 to the drive shaft 36 by a value α. The reason will be described below.

In FIG. 3, if the dual-drive mode transition threshold Tref is set, it is determined whether or not the required torque Tr* is greater than the dual-drive mode transition threshold Tref (Step S150). If it is determined that the required torque Tr* is equal to or less than the dual-drive mode transition threshold Tref, the motor single-drive mode is selected (Step S160), and the traveling mode selection processing routine ends. If it is determined that the required torque Tr* is greater than the dual-drive mode transition threshold Tref, the motor dual-drive mode is selected (Step S170), and the traveling mode selection processing routine ends. As described above, since the dual-drive mode transition threshold Tref is set as a value lower than the maximum value of torque outputtable from the motor MG2 to the drive shaft 36, transition from the motor single-drive mode to the motor dual-drive mode is performed while there is a margin in torque output from the motor MG2 with respect to the maximum value thereof.

Next, the operation in a case where the motor dual-drive mode is selected as the traveling mode will be described. FIG. 5 is a flowchart showing an example of a motor dual-drive mode control routine which is executed by the CPU 72 of the HVECU 70. This routine is repeatedly executed at every predetermined time (for example, every several msec) when the motor dual-drive mode is selected as the traveling mode.

If the motor dual-drive mode control routine is executed, the CPU 72 of the HVECU 70 first executes processing for inputting data, such as the accelerator pedal angle Acc, the required torque Tr*, and motor maximum torque Tm2max (Step S200). In regard to the required torque Tr*, a value in Step S110 of the traveling mode selection processing routine is input. In regard to the motor maximum torque Tm2max, a value set as a maximum value corresponding to the rotation speed Nm2 from the rated torque of the motor MG2 is input.

If data is input in this way, a value obtained by multiplying the input required torque Tr* by a torque distribution ratio D, a conversion coefficient k1, and a value (−1) is set as a temporary motor torque Tm1tmp which is a temporary value of torque to be output from the motor MG1 (Step S210). The torque distribution ratio D is the ratio of torque output from the motor MG1 out of the required torque Tr*. When the torque distribution ratio D has a value of 0, the above-described motor single-drive mode is executed. The conversion coefficient k1 is a coefficient for converting the rotation speed of the drive shaft 36 into the rotation speed of the motor MG1 when the rotation of the carrier 34 is stopped. Then, it is determined whether or not the input accelerator pedal angle Acc is greater than a threshold Aref (Step S220). The threshold Aref is a threshold for determining whether or not the driver depresses the accelerator pedal 83 strongly, and can be determined to, for example, 80%, 90%, or the like. If it is determined that the accelerator pedal angle Acc is not greater than the threshold Aref, a correction constant τ (0<τ<1) is set to a value τ1 (Step S230). If it is determined that the accelerator pedal angle Acc is greater than the threshold Aref, the correction constant τ is set to a value τ2 smaller than the value τ1 (Step S240). Then, a torque command Tm1* of the motor MG1 is set based on the temporary motor torque Tm1tmp, the correction constant τ, and a torque command (previous Tm1*) of the motor MG1 set in the routine previously by Expression (1) described below (Step S250). The correction constant τ (0<τ<1) is a time constant when the torque command Tm1* of the motor MG1 is slowly changed toward the temporary motor torque Tm1tmp (target value). The smaller the value of the correction constant τ (the closer to the value 0), the higher the followability of the torque command Tm1* to the temporary motor torque Tm1tmp.

$$Tm1^* = (1-\tau) \cdot Tm1tmp + \tau \cdot previousTm1^* \quad (1)$$

Figure 6A:
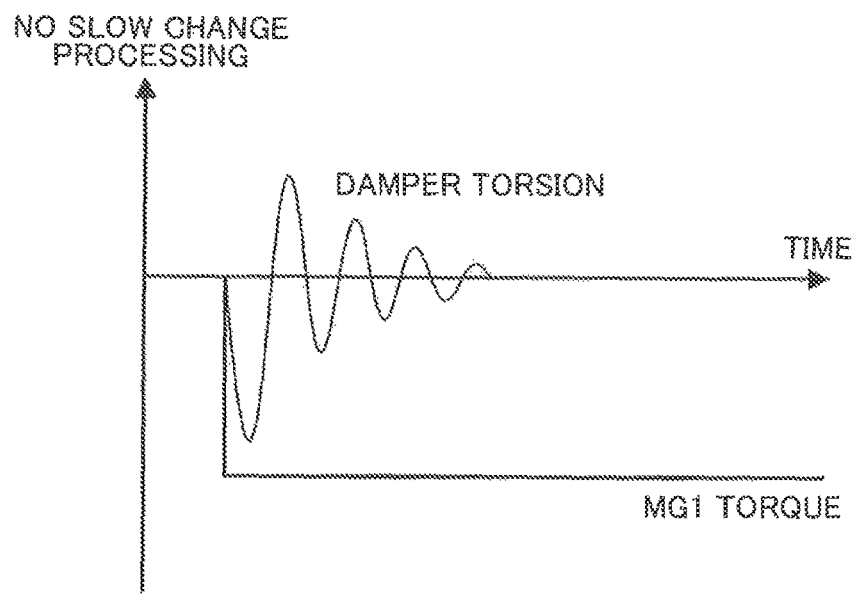
FIG. 6A is an explanatory view showing a state of torsion of a damper 28 in a case where torque output from a motor MG1 is not slowly changed.
Figure 6B:
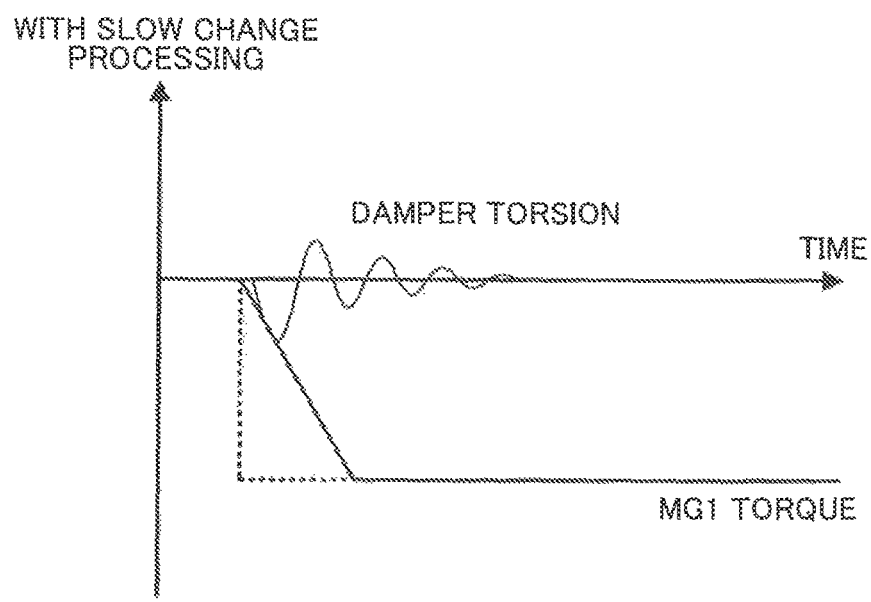
FIG. 6B is an explanatory view showing a state of torsion of the damper 28 in a case where torque output of the motor MG1 is slowly changed.

FIGS. 6A and 6B are explanatory views showing a state of torsion of the damper 28 in a case where torque output from the motor MG1 is not slowly changed and a case where torque output from the motor MG1 is slowly changed, respectively. In the motor dual-drive mode, torque is output to the drive shaft 36 by being output negative torque from the motor MG1 in a state where the rotation of the carrier 34 is stopped by the one-way clutch C1. Then, in order to prevent excessive torque from being input to the one-way clutch C1 in the motor dual-drive mode, the damper 28 configured to suppress torsional vibration is provided between the one-way clutch C1 and the carrier 34. For this reason, in the motor dual-drive mode, the one-way clutch C1 becomes a fixed end and the torque of the motor MG1 is directly input to the damper 28. Then, in a case where torque output from the motor MG1 is not slowly changed, torque from the motor MG1 rapidly changes, and torsion occurs in the damper 28 (see FIG. 6A). Accordingly, in this example, torque output from the motor MG1 is slowly changed, torsion of the damper 28 is relaxed, and vibration (or shock) due to torsion is suppressed (see FIG. 6B).

However, if the slow change processing is executed, a lot of time is required according to the correction constant τ (time constant) until torque output from the motor MG1 converges on the temporary motor torque Tm1tmp (target value), and in the meantime, the torque of the motor MG1 may continue to change. When the accelerator pedal angle Acc is large, the required acceleration is high, and noise or vibration accompanied by traveling becomes large. For this reason, even if vibration (shock) due to torsion of the damper 28 becomes somewhat large, it is considered that there is almost no sense of discomfort felt by the driver. Accordingly, in this example, when the accelerator pedal angle Acc is equal to or less than the threshold Aref, the correction constant τ is set to the comparatively large value τ1 (close to the value 1), and when the accelerator pedal angle Acc is greater than the threshold Aref, the correction constant τ is set to the value τ2 (close to the value 0) smaller than the value τ1, thereby permitting large change in torque of the motor MG1. That is, a correction constant is set such that a maximum amount of change in torque per a predetermined time when the accelerator pedal angle Acc is larger than the threshold Aref is larger than a maximum amount of change in torque per a predetermined time when the accelerator pedal angle Acc is equal to or smaller than the threshold Aref. With this, it is possible to make the motor MG1 quickly converge on the temporary motor torque Tm1tmp, and to reduce fatigue of the damper 28 or the one-way clutch C1.

If the torque command Tm1* of the motor MG1 is set in this way, as in Step S260 of FIG. 5, a value obtained by dividing the torque command Tm1* by the conversion coefficient k1 is subtracted from the required torque Tr* and is further multiplied by the conversion coefficient k2, thereby setting a temporary motor torque Tm2tmp which is a temporary value of torque output from the motor MG2. Next, in Step S270, a smaller value out of the temporary motor torque Tm2tmp and the motor maximum torque Tm2max is set as a torque command Tm2* of the motor MG2. Then, both of the set torque commands Tm1*, Tm2* are transmitted to the motor ECU 40 (Step S280), and the motor dual-drive mode control routine ends. Upon receiving the torque commands Tm1*, Tm2*, the motor ECU 40 switches the switching elements of the inverters 41, 42 such that torque according to the torque commands Tm1*, Tm2* are respectively output from the motors MG1, MG2.

In this way, in the motor dual-drive mode, torque output from the motor MG1 is slowly changed and the torque commands Tm1*, Tm2* are set such that the required torque Tr* is output from the motor MG2 to the drive shaft 36 within a range of the motor maximum torque Tm2max (rated torque), thereby driving and controlling the motors MG1, MG2. For this reason, if the temporary motor torque Tm1tmp which is the target value of torque output from the motor MG1 rapidly decreases (an absolute value rapidly increases), a shortage of torque with respect to the temporary motor torque Tm1tmp occurs until the torque command Tm1* converges on the temporary motor torque Tm1tmp. At this time, if the torque of the motor MG2 does not reach the rated torque (motor maximum torque Tm2max), a shortage of torque in the motor MG1 can be compensated for with an increase in torque from the motor MG2. However, if the torque of the motor MG2 reaches the rated torque, it is not possible to compensate for the shortage with an increase in torque from the motor MG2 and to output the required torque Tr* to the drive shaft 36. In this example, transition is made from the motor single-drive mode to the motor dual-drive mode while there is a margin in torque output from the motor MG2 to the drive shaft 36 by the value α. For this reason, even if the torque of the motor MG1 is slowly changed when transition is made from the motor single-drive mode to the motor dual-drive mode, it is possible to suppress a shortage of torque output to the drive shaft 36 with respect to the required torque Tr*.

Figure 7:
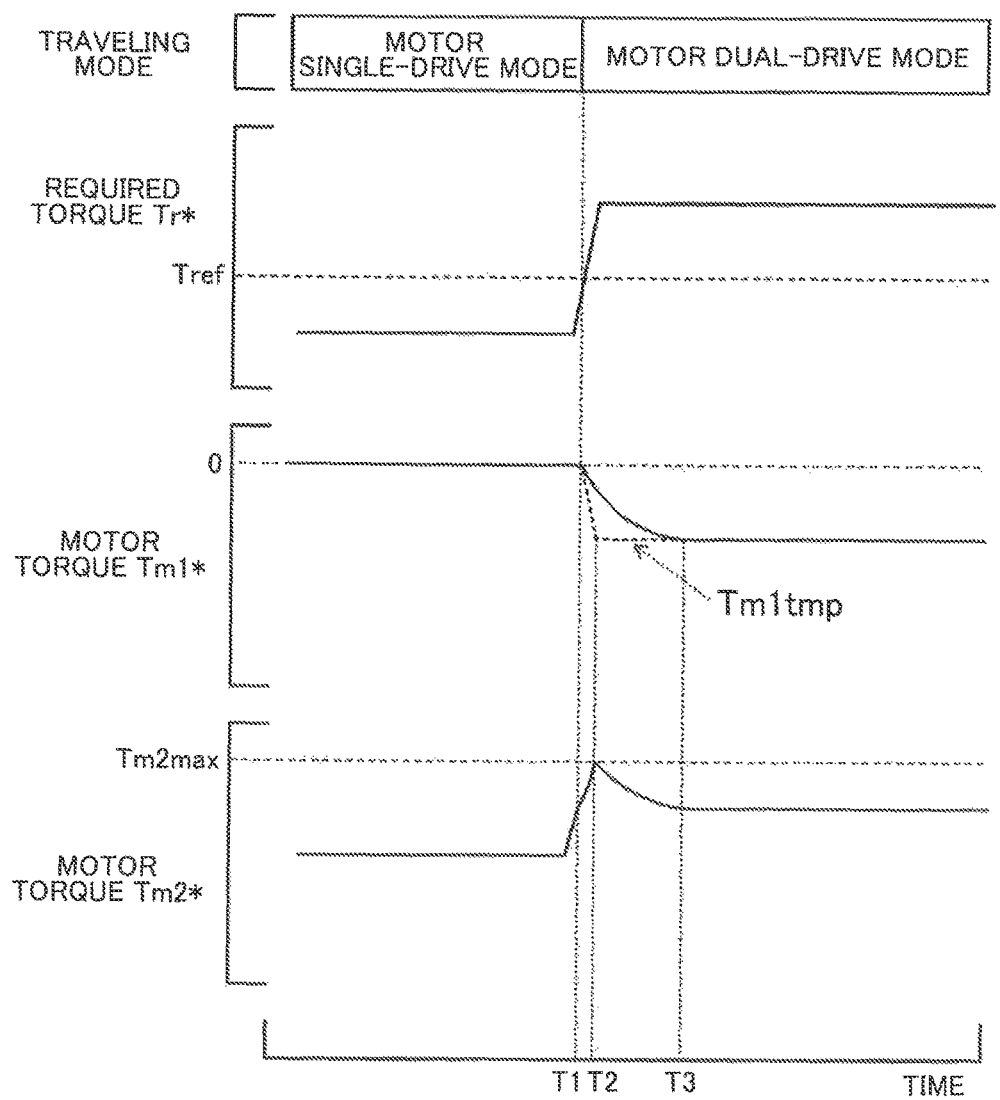
FIG. 7 is an explanatory view showing a state of change over time of required torque Tr*, torque Tm1* of the motor MG1, and torque Tm2* of a motor MG2 at the time of transition from a motor single-drive mode to a motor dual-drive mode.

FIG. 7 is an explanatory view showing a state of changes over time of the required torque Tr*, the torque Tm1* of the motor MG1, and the torque Tm2* of the motor MG2 when transition is made from the motor single-drive mode to the motor dual-drive mode. As shown in the drawing, during traveling in the motor single-drive mode, if the required torque Tr* exceeds the dual-drive mode transition threshold Tref, transition is made to the motor dual-drive mode (time T1). At this time, torque output from the motor MG2 is lower than the motor maximum torque Tm2max. Then, if transition is made to the motor dual-drive mode, the torque command Tm1* of the motor MG1 is slowly changed with respect to the temporary motor torque Tm1tmp (target value) by the slow change processing (correction processing) (time T2 to T3). At this time, since there is yet a margin in the torque of the motor MG2 with respect to the motor maximum torque Tm2max, a shortage of torque due to slow change is compensated for with an increase in torque output from the motor MG2.

According to the hybrid vehicle 20 of this example described above, transition is made from the motor single-drive mode to the motor dual-drive mode while there is a margin in torque output from the motor MG2 with respect to the rated torque (motor maximum torque Tm2max). With this, even when the torque of the motor MG1 is subjected to the slow change processing in the motor dual-drive mode, it is possible to compensate for a shortage of the torque of the motor MG1 due to the slow change processing with an increase in torque from the motor MG2. Furthermore, it is possible to suppress the occurrence of vibration (shock) due to torsion of the damper 28 through the slow change processing. As a result, it is possible to achieve both of reduction of a shock due to the torque of the motor MG1 and output of the required torque Tr* to the drive shaft 36.

According to the hybrid vehicle 20 of this example, the correction constant τ is set to the value τ2 smaller than the value τ1 such that, when the accelerator pedal angle Ace is greater than the threshold Aref, larger change in torque of the motor MG is permitted than when the accelerator pedal angle Ace is equal to or less than the threshold Aref. With this, it is possible to make the motor MG1 quickly converge on the temporary motor torque Tm1tmp (target value) within a range in which a sense of discomfort is not given to the driver, and to reduce fatigue of the damper 28 or the one-way clutch C1.

According to the hybrid vehicle 20 of this example, the damper 28 is provided between the one-way clutch C1 and the carrier 34. With this, when the one-way clutch C1 stops the rotation of the carrier 34, it is possible to protect the one-way clutch C1 from an input of excessive torque.

In the hybrid vehicle 20 of the example, the dual-drive mode transition threshold Tref is set so as to be lowered from the maximum value (motor maximum torque Tm2max) according to the rotation speed Nm2 of the motor MG2 by a predetermined value with respect to the rated torque of the motor MG2. However, when the torque of the motor MG2 is limited by any one of an input voltage of the inverter 42, the temperature of the inverter 42, the temperature of the motor MG2, or the like, the dual-drive mode transition threshold Tref may be varied so as to be smaller when the limit width of torque is larger.

In the hybrid vehicle 20 of the example, when the accelerator pedal angle Ace is equal to or less than the threshold Aref, the correction constant τ is set to the value τ1, and when the accelerator pedal angle Ace is greater than the threshold Aref, the correction constant τ is set to the value τ2 smaller than the value τ1. However, the correction constant τ may be set so as to have a smaller value when the accelerator pedal angle Ace is larger. In this case, the correction constant τ may be changed in a stepwise manner (changed in three or more steps) with respect to change in the accelerator pedal angle Ace, or the correction constant τ may be changed continuously with respect to change in the accelerator pedal angle Ace.

In the hybrid vehicle 20 of the example, the correction constant τ is set based on the accelerator pedal angle Acc. However, the correction constant τ may be set based on the required acceleration instead of the accelerator pedal angle Ace. In this case, when the required acceleration is equal to or lower than a predetermined acceleration, the correction constant τ may be set to the value τ1, and when the required acceleration is higher than the predetermined acceleration, the correction constant τ may be set to the value τ2 smaller than the value τ1. The higher the required acceleration, the smaller the correction constant τ may be set.

In the hybrid vehicle 20 of the example or a modification example thereof, the correction constant τ is set based on the accelerator pedal angle Acc or the required acceleration. However, a constant value may be set as the correction constant τ regardless of the accelerator pedal angle Ace or the required acceleration.

In the hybrid vehicle 20 of the example, torque output from the motor MG1 is slowly changed by the correction processing in the motor dual-drive mode. However, rate processing may be performed for changing torque output from the motor MG1 toward a target value (temporary motor torque Tm1tmp) by a predetermined value in the motor dual-drive mode. In this case, the predetermined value (rate) may be varied based on the accelerator pedal angle Ace or the required acceleration.

Figure 8:
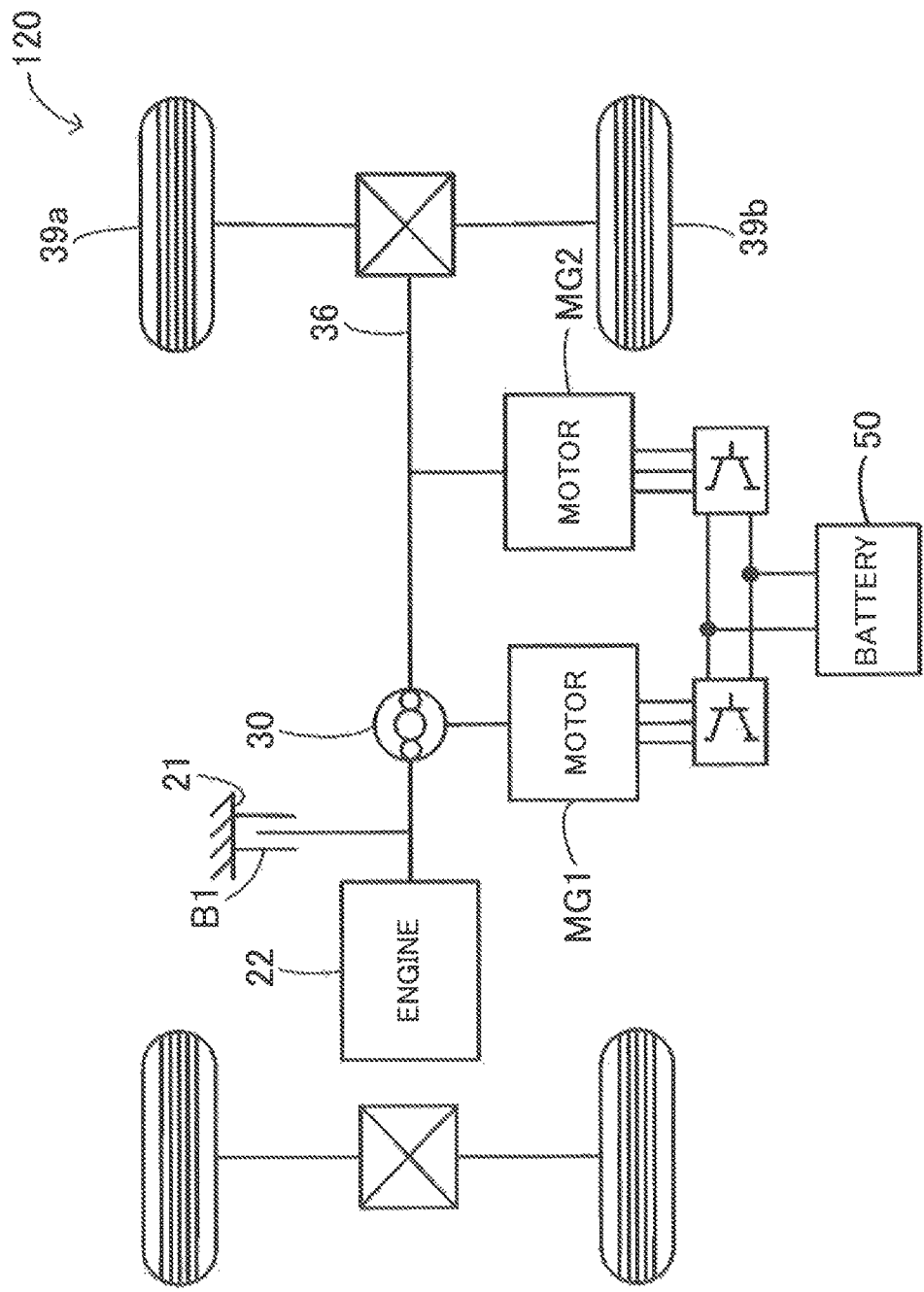
FIG. 8 is a configuration diagram showing the outline of the configuration of a hybrid vehicle 120 of a modification example.

In the hybrid vehicle 20 of the example, although the one-way clutch C1 is attached to the carrier 34, as illustrated in a hybrid vehicle 120 of a modification example of FIG. 8, a brake B1 may be attached to the carrier 34 to fix (connect) the carrier 34 to the case 21 unrotatably and to release the carrier 34 rotatably with respect to the case 21. In this case, in the motor dual-drive mode, basically, the brake B1 is turned on to fix the carrier 34, and traveling is performed.

In the hybrid vehicle 20 of the example, the motor MG2 is connected to the drive shaft 36 through the reduction gear 35. However, the motor MG2 may be directly coupled to the drive shaft 36. Furthermore, the motor MG2 may be connected to the drive shaft 36 through a transmission.

In the hybrid vehicle 20 of the example, the planetary gear device has one planetary gear 30. However, the planetary gear device may have a plurality of planetary gears. In this case, a configuration shown in a hybrid vehicle 220 of a modification example of FIG. 9 may be made.

Figure 9:
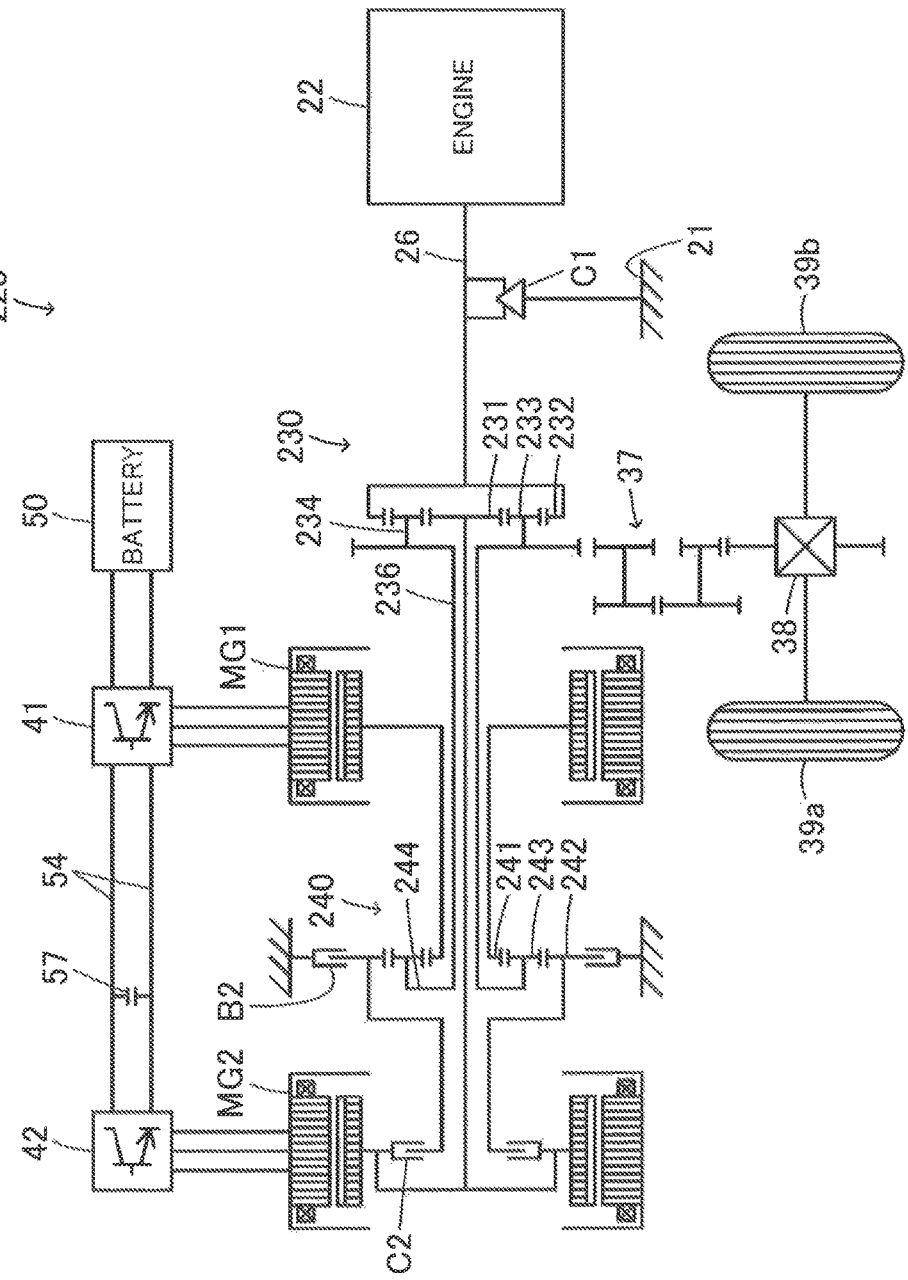
FIG. 9 is a configuration diagram showing the outline of the configuration of a hybrid vehicle 220 of a modification example.

The hybrid vehicle 220 of the modification example of FIG. 9 has, as a planetary gear device, planetary gears 230, 240 instead of the planetary gear 30 of the hybrid vehicle 20, and additionally has a clutch C2 and a brake B2.

The planetary gear 230 is constituted as a single pinion type planetary gear (planetary gear), and has a sun gear 231 as an external gear, a ring gear 232 as an internal gear, a plurality of pinion gears 233 which mesh with the sun gear 231 and the ring gear 232, and a carrier 234 which holds a plurality of pinion gears 233 rotatably and revolvably. The rotor of the motor MG2 is connected to the sun gear 231. The crank shaft 26 of the engine 22 is connected to the ring gear 232. A drive shaft 236 coupled to the drive wheels 39a, 39b through the differential gear 38 and the gear mechanism 37 is connected to the carrier 234.

The planetary gear 240 is constituted as a single pinion type planetary gear (planetary gear), and has a sun gear 241 as an external gear, a ring gear 242 as an internal gear, a plurality of pinion gears 243 which mesh with the sun gear 241 and the ring gear 242, and a carrier 244 which holds a plurality of pinion gears 243 rotatably and revolvably. The rotor of the motor MG1 is connected to the sun gear 241. The drive shaft 236 is connected to the carrier 244.

The clutch C2 connects the sun gear 231 of the planetary gear 230 and the rotor of the motor MG2 to the ring gear 242 of the planetary gear 240 and releases the connection of the sun gear 231 of the planetary gear 230 and the rotor of the motor MG2 to the ring gear 242 of the planetary gear 240. The brake B2 fixes (connects) the ring gear 242 of the planetary gear 240 to the case 21 unrotatably and releases the ring gear 242 rotatably with respect to the case 21.

Figure 10:
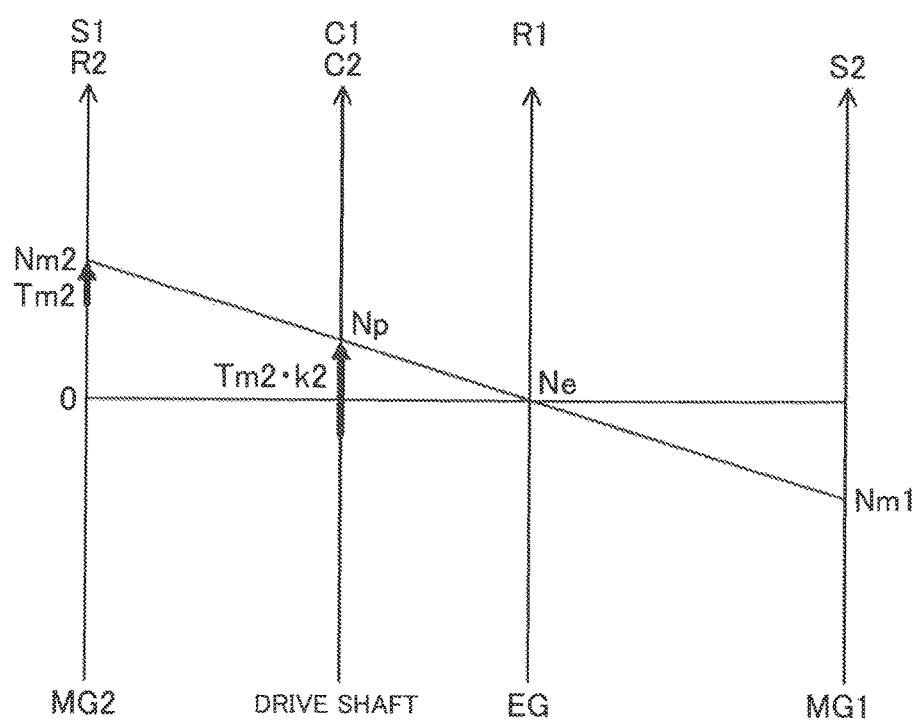
FIG. 10 is an explanatory view showing an example of a collinear diagram of planetary gears 230, 240 in a single-drive mode when a clutch C2 is brought into an engagement state and a brake B2 is brought into a release state.
Figure 11:
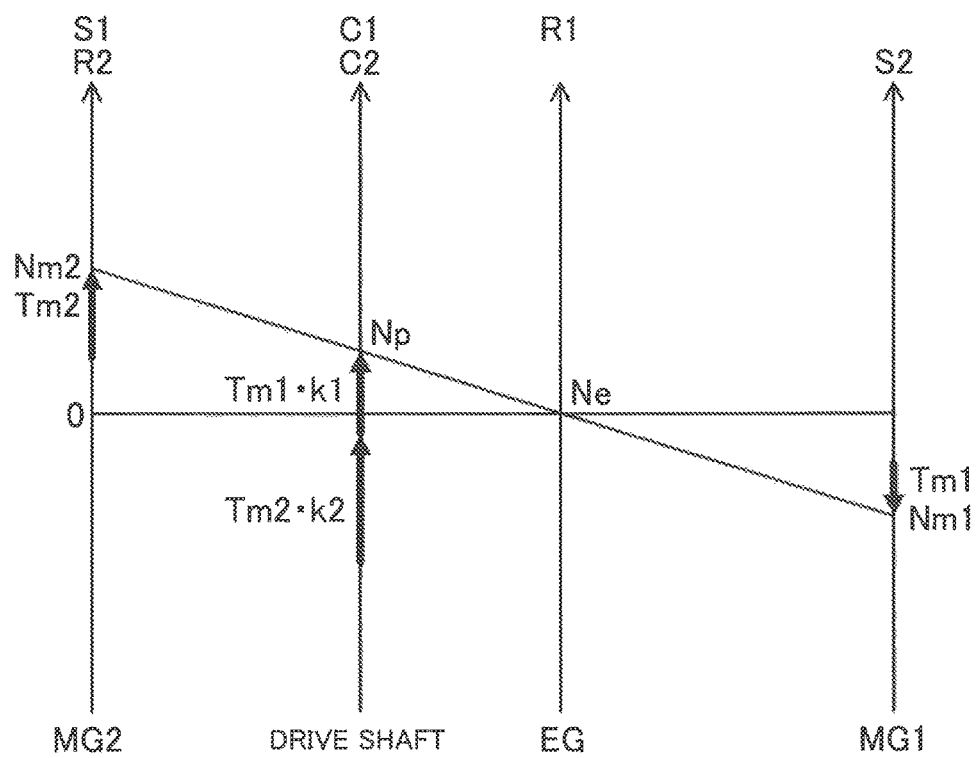
FIG. 11 is an explanatory view showing an example of a collinear diagram of the planetary gears 230, 240 in a dual-drive mode when the clutch C2 is brought into the engagement state and the brake B2 is brought into the release state.
Figure 12:
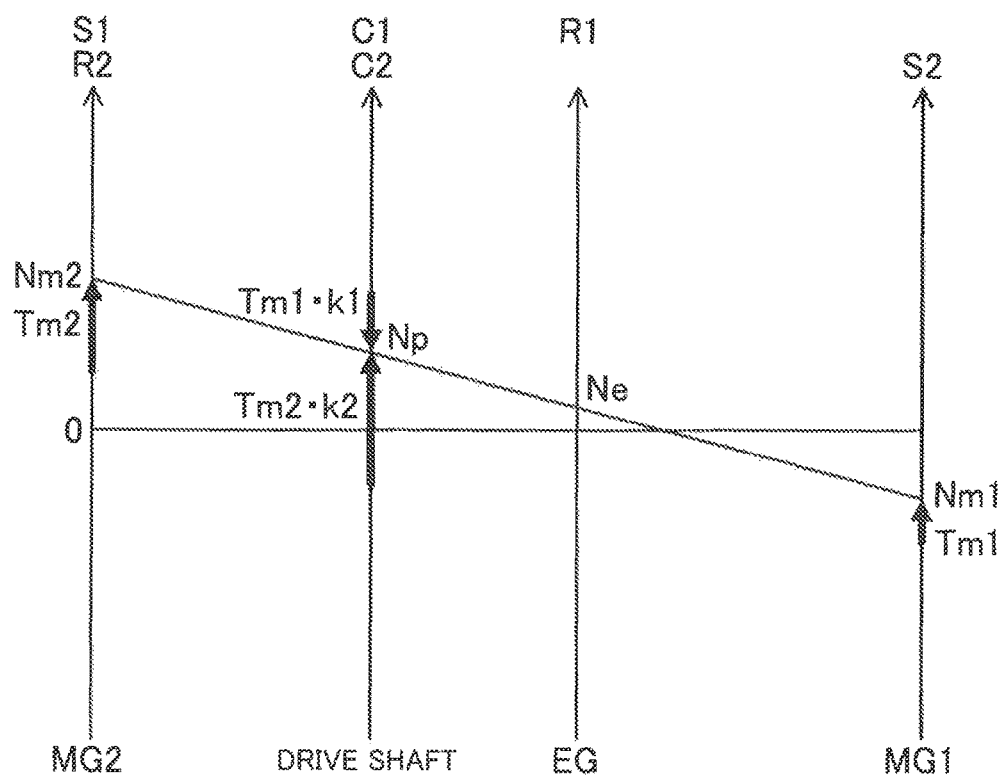
FIG. 12 is an explanatory view showing an example of a collinear diagram of the planetary gears 230, 240 at the time of the start of an engine 22 when the clutch C2 is brought into the engagement state and the brake B2 is brought into the release state.

FIGS. 10 to 12 are explanatory views showing an example of a collinear diagram of the planetary gears 230, 240 at the time of the start of engine 22 in the dual-drive mode and the single-drive mode when the clutch C2 is brought into an engagement state and the brake B2 is brought into a release state.

In FIGS. 10 to 12, an S1 and R2 axis indicates the rotation speed Nm2 of the motor MG2 which is the rotation speed of the sun gear 231 of the planetary gear 230, and indicates the rotation speed of the ring gear 242 of the planetary gear 240, a C1 and C2 axis indicates a rotation speed Np of the drive shaft 236 which is the rotation speeds of the carriers 234, 244 of the planetary gears 230, 240, an R1 axis indicates the rotation speed Ne of the engine 22 which is the rotation speed of the ring gear 232 of the planetary gear 230, and an S2 axis indicates the rotation speed Nm1 of the motor MG1 which is the rotation speed of the sun gear 241 of the planetary gear 240.

In FIG. 10, a bold arrow on the S1 and R2 axis indicates torque Tm2 which is output from the motor MG2, a bold arrow on the C1 and C2 axis indicates torque (Tm2·k2) which is output from the motor MG2 and applied to the drive shaft 236. The conversion coefficient k2 is a coefficient for converting the torque Tm2 of the motor MG2 into the torque of the drive shaft 236. In FIGS. 11 and 12, a bold arrow on the S2 axis indicates torque Tm1 which is output from the motor MG1, a bold arrow on the S1 and R2 axis shows torque Tm2 which is output from the motor MG2, and two bold arrows on the C1 and C2 axis indicate torque (Tm1·k1+Tm2·k2) which are output from the motors MG1, MG2 and applied to the drive shaft 236. The conversion coefficient k1 is a coefficient for converting the torque Tm1 of the motor MG1 into the torque of the drive shaft 236.

In cases of FIGS. 10 to 12, the clutch C2 is brought into the engagement state, whereby the rotation speed of the sun gear 231 of the planetary gear 230 and the rotation speed Nm2 of the motor MG2 become equal to the rotation speed of the ring gear 242 of the planetary gear 240. Accordingly, the planetary gears 230, 240 function as a so-called four-element type planetary gear device.

In the single-drive mode, as shown in FIG. 10, traveling can be performed by outputting positive torque Tm2 from the motor MG2 and applying positive torque (Tm2·k2) to the drive shaft 236. In this case, maximum torque (single-drive maximum torque) outputtable to the drive shaft 236 in the single-drive mode is equal to a value (Tm2rt2·k2) obtained by multiplying rated torque Tm2rt2 on the positive side of the motor MG2 by the conversion coefficient k2. This can be easily conduced from the collinear diagram of FIG. 10.

In the dual-drive mode, as shown in FIG. 11, traveling can be performed by outputting negative torque Tm1 from the motor MG1, outputting positive torque Tm2 from the motor MG2, and applying positive torque (Tm1·k1+Tm2·k2) to the drive shaft 36. Maximum torque (dual-drive maximum torque) outputtable to the drive shaft 236 in the dual-drive mode is equal to the sum (Tm1rt1·k1+Tm2rt2·k2) of a value obtained by multiplying rated torque Tm1rt1 on the negative side of the motor MG1 by the conversion coefficient k1 and a value obtained by multiplying rated torque Tm2rt2 on the positive side of the motor MG2 by the conversion coefficient k2. This can be easily conduced from the collinear diagram of FIG. 11.

At the time of the start of the engine 22, as shown in FIG. 12, the positive torque Tm1 is output from the motor MG1 and the engine 22 is cranked.

In such modification examples, as in the example, the traveling mode selection processing routine of FIG. 3 is executed, the dual-drive mode transition threshold Tref is set to a value smaller than the single-drive maximum torque, and when the required torque Tr* exceeds the dual-drive mode transition threshold Tref, transition is made from the single-drive mode to the dual-drive mode, whereby it is possible to obtain the same effects as in the example.

The correspondence relationship between the primary components of the embodiment and the primary components of the embodiment described in Summary will be described. In the example, the engine 22 corresponds to an "engine", the motor MG1 corresponds to a "first motor", the planetary gear 30 corresponds to a "planetary gear device", the sun gear 31 corresponds to a "first rotating element", the carrier 34 corresponds to a "second rotating element", the ring gear 32 corresponds to a "third rotating element", the motor MG2 corresponds to a "second motor", the battery 50 corresponds to a "power storage device", the one-way clutch C1 corresponds to a "rotation regulating mechanism", the CPU 72 of the HVECU 70 which executes the traveling mode selection processing routine corresponds to a "traveling mode selection unit", and the CPU 72 of the HVECU 70 and the motor ECU 40 which executes the motor dual-drive mode control routine corresponds to a "control unit". In addition, the damper 28 corresponds to a "torsional vibration suppressing device".

The correspondence relationship between the primary components of the invention and the primary components of the embodiment described in Summary should not be considered to limit the components of the invention described in Summary since the embodiment is only illustrative to specifically describe the aspects of the invention. That is, the embodiment described in Summary should be interpreted based on the description in Summary, and the embodiment is only a specific example of the invention described in Summary.

Although the mode for carrying out the invention has been described using the example, the invention is not limited to the example, and can be of course carried out in various forms without departing from the spirit and scope of the invention.

The invention is usable in a manufacturing industry of a hybrid vehicle.

What is claimed is:
1. A hybrid vehicle comprising:
an engine;
a first motor configured to generate electric power;
a second motor configured to input power to a drive shaft, the drive shaft being coupled to the first motor and an axle;

at least one planetary gear including a first rotating element, a second rotating element and a third rotating element,
- the first rotating element being connected to the first motor,
- the second rotating element being connected to the engine,
- the third rotating element being connected to the drive shaft, and
- the first rotating element, the second rotating element and the third rotating element being arranged such that a negative torque output from the first motor is transmitted to the drive shaft as a positive torque;

a power storage device configured to exchange electric power with the first motor and the second motor;

a rotation regulating mechanism provided between the engine and the second rotating element, the rotation regulating mechanism being configured to regulate rotation of the second rotating element; and at least one electronic control unit configured to
- select a traveling mode, the traveling mode including a motor single-drive mode in which traveling is able to be performed with torque only from the second motor and a motor dual-drive mode in which the second rotating element is brought into a rotation stop state by the rotation regulating mechanism and traveling is able to be performed with torque from the first motor and the second motor,
- control the engine, the first motor, and the second motor such that traveling is performed with a required torque using the selected traveling mode,
- when the required torque exceeds a threshold while the motor single-drive mode is selected, select the motor dual-drive mode, the threshold being determined to torque smaller than a maximum output torque of the second motor, and
- when the motor dual-drive mode is selected, control the first motor and the second motor such that traveling is performed with the required torque while executing a correction processing for gradually changing torque output from the first motor.

2. The hybrid vehicle according to claim 1,
wherein the at least one electronic control unit is configured to control the first motor and the second motor such that an amount of change in torque per a predetermined time in the correction processing when a required acceleration exceeds a predetermined acceleration becomes greater than an amount of change in torque per the predetermined time in the correction processing when the vehicle acceleration is equal to or lower than the predetermined acceleration.

3. The hybrid vehicle according to claim 1,
wherein the at least one electronic control unit is configured to control the first motor and the second motor such that an amount of change in torque per a predetermined time in the correction processing when an accelerator pedal angle exceeds a predetermined threshold becomes greater than an amount of change in torque per the predetermined time in the correction processing when the accelerator pedal angle is equal to or less than the predetermined threshold.

4. The hybrid vehicle according to claim 1,
wherein an output shaft of the engine is connected to the second rotating element through a torsional vibration suppressing device, and the torsional vibration suppressing device is provided between the rotation regulating mechanism and the second rotating element.

* * * * *